United States Patent
Stanich et al.

(10) Patent No.: US 11,305,550 B2
(45) Date of Patent: Apr. 19, 2022

(54) INK DEPOSITION UNIFORMITY COMPENSATION MECHANISM

(71) Applicants: Mikel Stanich, Longmont, CO (US);
Nikita Gurudath, Boulder, CO (US);
Walter F. Kailey, Frederick, CO (US);
Larry M. Ernst, Longmont, CO (US)

(72) Inventors: Mikel Stanich, Longmont, CO (US);
Nikita Gurudath, Boulder, CO (US);
Walter F. Kailey, Frederick, CO (US);
Larry M. Ernst, Longmont, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/286,883

(22) Filed: Feb. 27, 2019

(65) Prior Publication Data

US 2020/0274991 A1 Aug. 27, 2020

(51) Int. Cl.
| | |
|---|---|
| B41J 2/20 | (2006.01) |
| B41J 2/205 | (2006.01) |
| B41J 2/21 | (2006.01) |
| B41J 29/393 | (2006.01) |
| H04N 1/405 | (2006.01) |
| G06K 15/10 | (2006.01) |

(52) U.S. Cl.
CPC ........... B41J 2/2054 (2013.01); B41J 2/2052 (2013.01); B41J 2/2132 (2013.01); B41J 29/393 (2013.01); H04N 1/405 (2013.01); B41J 2029/3935 (2013.01); G06K 15/105 (2013.01)

(58) Field of Classification Search
None
See application file for complete search history.

(56) References Cited

U.S. PATENT DOCUMENTS

| | | | |
|---|---|---|---|
| 6,270,187 B1 | 8/2001 | Murcia et al. |
| 7,024,126 B2 | 4/2006 | Kellie et al. |
| 8,235,490 B2 | 8/2012 | Chanda et al. |
| 8,322,811 B2 | 12/2012 | Chandu et al. |
| 8,542,418 B2 | 9/2013 | Chandu et al. |
| 8,573,731 B2 | 11/2013 | Bastani et al. |
| 8,699,103 B2 | 4/2014 | Mestha et al. |

(Continued)

FOREIGN PATENT DOCUMENTS

| | | |
|---|---|---|
| EP | 1157840 B1 | 7/2007 |
| JP | 2018-133801 A | 8/2018 |
| WO | 2008059264 A1 | 5/2008 |

OTHER PUBLICATIONS

Hansen et al, "High-Throughput Printing via Microvascular Multinozzle Arrays", Advanced Materials, 25(1), pp. 96-102.

(Continued)

*Primary Examiner* — Barbara D Reinier
(74) *Attorney, Agent, or Firm* — Jaffery Watson Mendonsa & Hamilton LLP

(57) ABSTRACT

A printing system is disclosed. The printing system includes at least one physical memory device to store halftone calibration logic and one or more processors coupled with the at least one physical memory device to execute the halftone calibration logic determine an uncalibrated deposition distribution for each of a plurality of pel forming elements, determine a calibrated deposition distribution for each of the plurality of pel forming elements and determine calibration values for each of the plurality of pel forming elements.

20 Claims, 12 Drawing Sheets

(56) References Cited

U.S. PATENT DOCUMENTS

| | | | |
|---|---|---|---|
| 8,967,757 B2 | 3/2015 | Bastani et al. | |
| 9,621,762 B2 | 4/2017 | Chandu et al. | |
| 9,656,463 B1 | 5/2017 | Ernst | |
| 9,661,154 B1 | 5/2017 | Stanich et al. | |
| 9,785,873 B2 | 10/2017 | Stanich et al. | |
| 9,914,309 B2 | 3/2018 | Billow et al. | |
| 10,082,990 B2 | 9/2018 | Martin et al. | |
| 10,488,846 B2 | 11/2019 | Donovan | |
| 10,549,523 B2 | 2/2020 | Stanich | |
| 2006/0072160 A1 | 4/2006 | Yamazaki | |
| 2012/0050755 A1* | 3/2012 | Chandu | H04N 1/6033 358/1.9 |
| 2013/0021400 A1 | 1/2013 | Tamagawa | |
| 2013/0076825 A1 | 3/2013 | Szafraniee | |
| 2013/0176600 A1* | 7/2013 | Chandu | H04N 1/405 358/3.06 |
| 2013/0293611 A1 | 11/2013 | Ueshima | |
| 2014/0313255 A1 | 10/2014 | Ukishima | |
| 2015/0062233 A1 | 3/2015 | Ueshima | |
| 2016/0052318 A1* | 2/2016 | Humet Pous | B41J 2/01 347/19 |
| 2016/0100079 A1 | 4/2016 | Gerrits | |
| 2017/0236041 A1* | 8/2017 | Stanich | H04N 1/4057 358/1.9 |
| 2018/0008995 A1 | 1/2018 | Baker et al. | |
| 2018/0022131 A1 | 1/2018 | Klinger et al. | |
| 2018/0234582 A1 | 8/2018 | Stanich et al. | |
| 2018/0236776 A1 | 8/2018 | Stanich et al. | |
| 2019/0389227 A1 | 12/2019 | Stanich et al. | |
| 2020/0094546 A1 | 3/2020 | Samadzadegan | |

OTHER PUBLICATIONS

Office Action from U.S. Appl. No. 16/995,999, dated May 10, 2021, 15 pages.

Vantram, S. R. (2014). Fully Automated Calibration Procedure to Compensate Print Non-uniformities Incurred in Fixed Print-head Array Structures. Retrieved from https://jp.ricoh.com/-/Media/Ricoh/Sites/jp_ricoh/technologyreport/39/pdf/RTR39a18.pdf See highlighted sections.

Office Action from U.S. Appl. No. 16/995,999, dated Aug. 3, 2021, 14 pages.

Office Action for U.S. Appl. No. 17/193,906, dated Nov. 23, 2021, 16 pages.

* cited by examiner mult_array(:,:,1) =

254 230 90 16 2 25 82 222
247 214 132 41 8 58 156 189
99 148 181 140 74 123 173 107
33 66 165 206 239 197 115 49
2 25 82 222 255 230 90 16
8 58 156 189 247 214 132 41
74 123 173 107 99 148 181 140
239 197 115 49 33 66 165 206 mult_array(:,:,2) =

252 228 88 14 1 22 80 219
244 211 129 38 5 55 154 186
96 145 178 137 71 121 170 104
30 63 162 203 236 195 112 47
1 22 80 219 252 228 88 14
5 55 154 186 244 211 129 38
71 121 170 104 96 145 178 137
236 195 112 47 30 63 162 203 mult_array(:,:,3) =

250 225 85 11 0 19 77 217
241 208 126 36 3 52 151 184
93 143 175 134 69 118 167 101
27 60 159 200 233 192 110 44
0 19 77 217 250 225 85 11
3 52 151 184 241 208 126 36
69 118 167 101 93 143 175 134
233 192 110 44 27 60 159 200

| Col number | Relative contribution to total peak ink (5 column basis) | Relative contribution to total ink (solid area basis) |
|---|---|---|
| 3 | 0.360 | 0.352 |
| 2 | 0.244 | 0.239 |
| 4 | 0.244 | 0.239 |
| 1 | 0.076 | 0.074 |
| 5 | 0.076 | 0.074 |
| Sum | 1.000 | 0.978 |

Figure 11B

INK DEPOSITION UNIFORMITY COMPENSATION MECHANISM

FIELD OF THE INVENTION

The invention relates to the field of image reproduction, and in particular, to digital halftoning.

BACKGROUND

Current uniformity compensation approaches implement a macroscopic model that computes a unique transform function (TF) for each nozzle based on target responses and measured responses. However, such a model does not accurately account for microscopic case where we have adjacent (e.g., close by) nozzles, each being individually adjusted based on their respective nozzle measurements.

Furthermore, significant contributions of ink from the adjacent nozzles affect the measured response values for each individual nozzle. For instance, response measurements associated with an overlap of nozzle ink output may provide an inaccurate representation of a correction required for the actual overlap nozzle. Nozzles at the edges of a printhead may all be misdirected due to edge effects of an array, where the first/last set of nozzles lack neighboring nozzles. In this case, the impact to response measurements are due to the spatial distribution of the nozzles in addition to the potential impact of nozzle overlaps.

Accordingly, a mechanism to perform nozzle uniformity compensation to account for an actual position and contributions of adjacent nozzles is desired.

SUMMARY

In one embodiment, a printing system is disclosed. The printing system includes at least one physical memory device to store halftone calibration logic and one or more processors coupled with the at least one physical memory device to execute the halftone calibration logic determine an uncalibrated deposition distribution for each of a plurality of pel forming elements, determine a calibrated deposition distribution for each of the plurality of pel forming elements and determine calibration values for each of the plurality of pel forming elements.

In a further embodiment, a method is disclosed. The method includes determining an uncalibrated deposition distribution for each of a plurality of pel forming elements, determining a calibrated deposition distribution for each of the plurality of pel forming elements and determining calibration values for each of the plurality of pel forming elements.

BRIEF DESCRIPTION OF THE DRAWINGS

A better understanding of the present invention can be obtained from the following detailed description in conjunction with the following drawings, in which:

FIG. 11B illustrates one embodiment of nozzle contributions.

DETAILED DESCRIPTION

A uniformity compensation mechanism is described. In the following description, for the purposes of explanation, numerous specific details are set forth to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
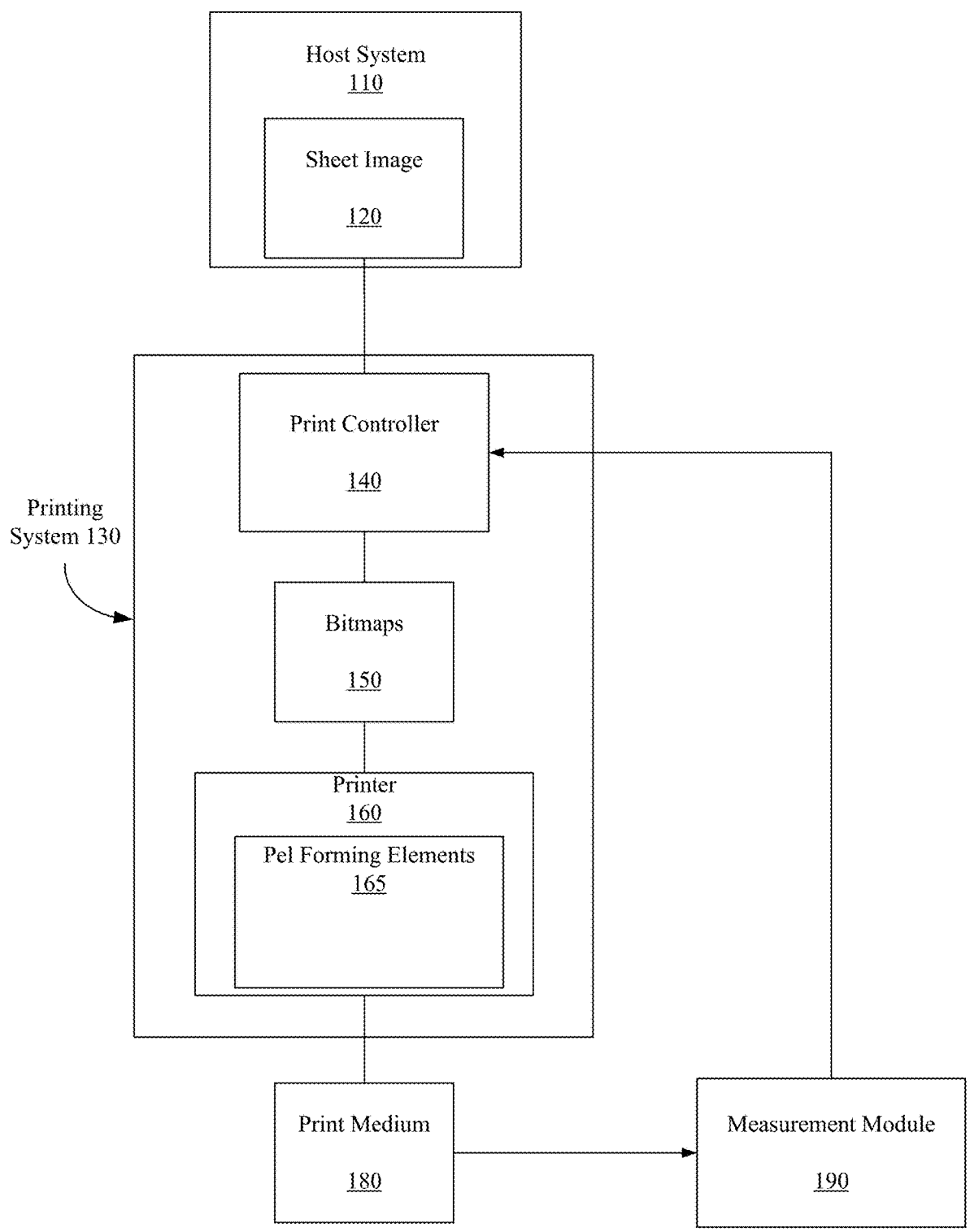
FIG. 1 is a block diagram of one embodiment of a printing system.

FIG. 1 is a block diagram illustrating one embodiment of a printing system 130. A host system 110 is in communication with the printing system 130 to print a sheet image 120 onto a print medium 180 via a printer 160. Print medium 180 may include paper, card stock, paper board, corrugated fiberboard, film, plastic, synthetic, textile, glass, composite or any other tangible medium suitable for printing. The format of print medium 180 may be continuous form or cut-sheet or any other format suitable for printing. Printer 160 may be an ink jet, electrophotographic or another suitable printer type.

In one embodiment, printer 160 comprises one or more pel forming elements 165 that directly or indirectly (e.g., by transfer) forms the representation of picture elements (pels) on the print medium 180 with marking material applied to the print medium. In an ink jet printer, the pel forming element 165 is a tangible device that ejects the ink onto the print medium 180 (e.g., an ink jet nozzle) and, in an electro-photographic (EP) printer the pel forming element may be a tangible device that determines the location of toner particles printed on the print medium (e.g., an EP exposure LED or an EP exposure laser). The pel forming elements 165 may be stationary (e.g., as part of a stationary printhead) or moving (e.g., as part of a printhead that moves across the print medium 180) as a matter of design choice.

In a further embodiment, printer 160 is a multi-pass printer (e.g., dual pass, 3 pass, 4 pass, etc.) wherein multiple sets of pel forming elements 165 print the same region of the print image on the print medium 180. The set of pel forming elements 165 may be located on the same physical structure (e.g., an array of nozzles on an ink jet print head) or separate physical structures. The resulting print medium 180 may be printed in color and/or in any of a number of gray shades, including black and white (e.g., Cyan, Magenta, Yellow, and blacK, (CMYK)). The host system 110 may include any computing device, such as a personal computer, a server, or even a digital imaging device, such as a digital camera or a scanner.

The sheet image 120 may be any file or data that describes how an image on a sheet of print medium 180 should be printed. For example, the sheet image 120 may include PostScript data, Printer Command Language (PCL) data, and/or any other printer language data. The print controller 140 processes the sheet image to generate a bitmap 150 for transmission. Bitmap 150 may be a halftoned bitmap (e.g., a calibrated halftone bit map generated from calibrated halftones, or uncalibrated halftone bit map generated from uncalibrated halftones) for printing to the print medium 180. The printing system 130 may be a high-speed printer operable to print relatively high volumes (e.g., greater than 100 pages per minute).

The print medium 180 may be continuous form paper, cut sheet paper, and/or any other tangible medium suitable for printing. The printing system 130, in one generalized form, includes the printer 160 that presents the bitmap 150 onto the print medium 180 (e.g., via toner, ink, etc.) based on the sheet image 120. Although shown as a component of printing system 130, other embodiments may feature printer 160 as an independent device communicably coupled to print controller 140.

The print controller 140 may be any system, device, software, circuitry and/or other suitable component operable to transform the sheet image 120 for generating the bitmap 150 in accordance with printing onto the print medium 180. In this regard, the print controller 140 may include processing and data storage capabilities. In one embodiment, measurement module 190 is implemented as part of a halftone calibration system to obtain measurements of the printed medium 180. The measured results are communicated to print controller 140 to be used in the halftone calibration process. The measurement system may be a stand-alone process or be integrated into the printing system 130.

According to one embodiment, measurement module 190 may be a sensor to take measurements of printed images on print medium 180. Measurement module 190 may generate and transmits measurement data 222. Measurement data 222 may be OD (e.g., optical density) data corresponding to a printed image. In one embodiment, measurement module 190 may comprise one or more sensors that each or in total take measurements for printed markings produced for some or all pel forming elements 165. In another embodiment, measurement module 190 may be a camera system, in-line scanner, densitometer or spectrophotometer. In a further embodiment, measurement data 222 may include a map information to correlate OD data to the corresponding pel forming elements 165.

Figure 2:
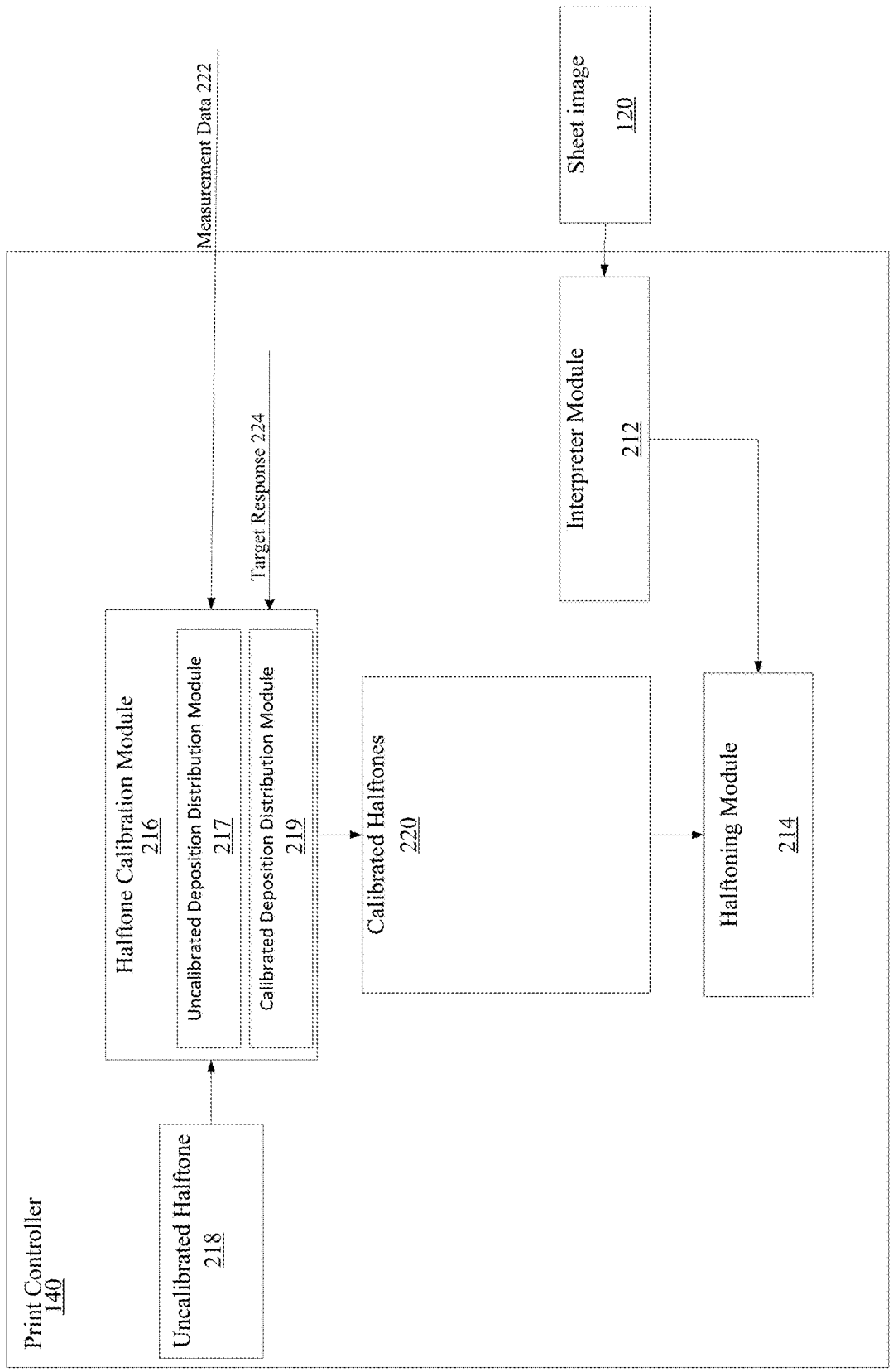
FIG. 2 is a block diagram of one embodiment of a print controller.

FIG. 2 is a block diagram illustrating an exemplary print controller 140. The print controller 140, in its generalized form, includes an interpreter module 212, a halftoning module 214, and a halftone calibration module 216. These separate components may represent hardware used to implement the print controller 140. Alternatively or additionally, the separate components may represent logical blocks implemented by executing software instructions in a processor of the printer controller 140.

The interpreter module 212 is operable to interpret, render, rasterize, or otherwise convert images (e.g., raw sheetside images such as sheet image 120) of a print job into sheetside bitmaps. The sheetside bitmaps generated by the interpreter module 212 are each a 2-dimensional array of pels representing an image of the print job (i.e., a Continuous Tone Image (CTI)), also referred to as full sheetside bitmaps. The 2-dimensional pel arrays are considered "full" sheetside bitmaps because the bitmaps include the entire set of pels for the image. The interpreter module 212 is operable to interpret or render multiple raw sheetsides concurrently so that the rate of rendering substantially matches the rate of imaging of production print engines.

Halftoning module 214 is operable to represent the sheetside bitmaps as halftone patterns of ink. For example, halftoning module 214 may convert the pels (also known as pixels) to halftone patterns of CMYK ink for application to the paper. A halftone design may comprise a pre-defined mapping of input pel gray levels to output drop sizes based on pel location.

In one embodiment, the halftone design may include a finite set of transition thresholds between a finite collection of successively larger drop sizes, beginning with zero and ending with a maximum drop size (e.g., threshold arrays or multibit threshold arrays). In another embodiment, the halftone design may include a three dimensional look-up table with all included gray level values. In a further embodiment, halftoning module 214 performs the multi-bit halftoning using the halftone design consisting of a set of threshold values for each pel in the sheetside bitmap, where there is one threshold for each non-zero ink drop size. The pel is halftoned with the largest drop whose corresponding threshold value it exceeds. This set of thresholds is referred to as a multi-bit threshold array (MTA).

Multi-bit halftoning is a halftone screening operation in which the final result is a selection of a specific drop size available from an entire set of drop sizes that the print engine is capable of employing for printing. Drop size selection based on the contone value of a single pel is referred to as "Point Operation" halftoning. The drop size selection is based on the pel values in the sheetside bitmap.

This contrasts with "Neighborhood Operation" halftoning, where multiple pels in the vicinity of the pel being printed are used to determine the drop size. Examples of neighborhood operation halftoning include the well-known error diffusion method.

Multi-bit halftoning is an extension of binary halftoning, where binary halftoning may use a single threshold array combined with a logical operation to decide if a drop is printed based on the contone level for a pel. Binary halftoning uses one non-zero drop size plus a zero drop size (e.g., a drop size of none where no ink is ejected). Multi-bit halftoning extends the binary threshold array concept to more than one non-zero drop size.

Multi-bit halftoning may use multiple threshold arrays (e.g., multi-bit threshold arrays), one threshold array for each non-zero drop size. The point operation logic is also extended to a set of greater than and less than or equal to operations to determine the drop size by comparing the threshold and image contone data for each pel. Multi-bit defines a power of two set of drop sizes (e.g., two bit halftone designs have four total drops, including a zero drop size). While power of two may be employed to define the number of drops, systems not following this such as a three total drop system may be used and are still considered multi-bit.

Figure 3:
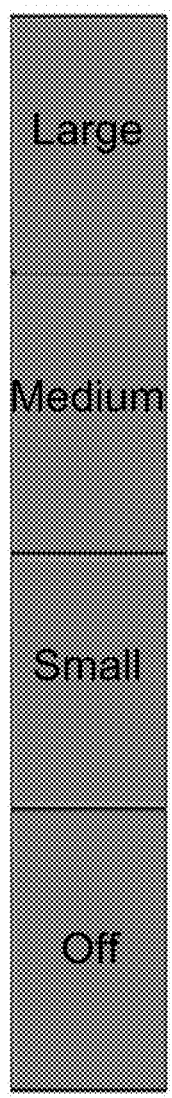
FIG. 3 illustrates one embodiment of multibit halftone designs, where the halftones are described using multi-bit threshold arrays (MTAs)

For multi-bit halftones, as shown in FIG. 3, the MTA is a three-dimensional array including one two-dimensional array for each drop size transition. Thus an MTA includes a set of two-dimensional arrays of thresholds for transition between drop sizes: plane one provides the threshold for the Large output level, while plane 2 and plane 3 provide thresholds for the Medium and Small output levels respectively for a system having three drop sizes not including zero drop size (none or off). In other embodiments, different one-to-one relationship may be used since the correspondence between plane numbers and drop sizes is arbitrary.

To use these threshold arrays for halftoning, in the case where the threshold arrays are smaller than the sheetside map, each multibit threshold array is tiled across contone image data provided by the sheetside bitmap, which provides a set of threshold values for each pel in the sheetside bitmap. The contone image data (e.g., gray level data) is logically compared to the threshold data on a pel basis. In the case of Large drops, they are produced by the halftoning when the image contone data is greater than the respective large threshold values in plane 1.

Medium drops are produced when the image data is greater than the medium drop plane 2 thresholds and also the image data is less than or equal to the large drop thresholds in plane 1. Small drops are produced when the image data is greater than the small drop thresholds in plane 3 and also the image data is less than or equal to the medium drop thresholds in plane 2.

Finally, the off/none drop size occurs for cases when the contone values is less than or equal to the small drop thresholds in plane 3. In this embodiment of a two-bit multibit printing system, this set of four logical equations, used with thresholds from each plane of the multibit threshold array permit each printing drop size to be defined, based on the contone values.

In other embodiments, the number of planes of threshold data can be extended to handle any number of drop sizes. The data from these two-dimensional arrays may be segmented into separate memory regions and stored in any convenient order. For example, the thresholds for each drop size transition may be stored contiguously in memory, and it is often advantageous to do so.

Halftone calibration module 216 performs a calibration process on an un-calibrated halftone 218 received at print controller 140 in order to generate one or more calibrated halftones 220. Calibrated halftones 220 are then received at halftoning module 214 along with the sheetside bitmap. In one embodiment, an un-calibrated halftone 218 represents a reference halftone design that is modified to create the calibrated halftones. In such an embodiment, measurements of the system response (e.g., measurement data 222) are received via measurement module 190 using the un-calibrated halftone 218 for printing.

According to one embodiment, halftone calibration module 216 measures test patterns applied to a medium (e.g., at printing system 130). In such an embodiment, a test pattern includes comb patterns printed at different tint levels to provide optical density (OD) information for each pel forming element 165 (e.g., nozzle). Thus, a test pattern also includes tint as a variable to provide additional information for the entire range of ink deposition, and to confirm data from the comb pattern analysis using the calibrated halftone. As a result, the OD distribution of each nozzle for each tint level may be converted to a corresponding distribution of ink deposition.

In a further embodiment, the comb patterns are printed using each of the different halftone drop sizes to reduce a number of ticks (marks) for the entire test pattern, which requires extrapolation of the ink deposition data to obtain the deposition for all tint levels, employing the halftone to extend the ink distribution for a single drop size to the ink distribution for all gray levels or tints. Accordingly, halftone calibration module 216 receives the measurement data 222 and determines ink deposition levels using the OD and pattern layout information.

In one embodiment, the ink deposition levels are determined for each tint level/digital count included in the test pattern. In a further embodiment, a Weibull ink density transform, is applied to the measured OD data for a pattern and the pattern layout information to determine ink deposition. The Weibull ink density transform is a version of the classical Weibull cumulative distribution function (CDF), modified to include a variable for paper optical density bias and a variable for maximum optical density.

In one embodiment, a four parameter Weibull model is implemented using:

$$OD = p(3) \times (1 - \exp^{((-x/p(1)\wedge p(2)))}) + p(4)$$

where P(3) defines a maximum OD, and p(4) is the paper OD. Additionally x=ink coverage mass per area (or ink usage), p(1)=ink mass per area scale factor, and p(2)=slope factor. Given the above equation, ink usage may be determined from OD using the inverse relationship:

$$x = \exp^{((ln(-ln(1-((OD-p(4))/p(3))))/p(2)) + ln(p(1)))}, \text{ or}$$
$$x = 10^{((log(-ln(1-((OD-p(4))/p(3))))/p(2)) + log(p(1)))},$$

where ln is natural log and log is logarithm base 10.

An imaginary x value indicates that the OD is not achievable, since it exceeds the theoretical maximum p(4)+p(3). In embodiments, OD values are greater than the paper white OD p(4), to obtain valid ink depositions x. Typically, the Weibull ink model is applied at a macro level. In this application, it will be employed at a nozzle level. Analysis of the comb pattern ink depositions is performed for each of the gray levels to determine vector estimates for the average peak ink deposition functions for each nozzle (or uncalibrated deposition distribution) px(DC); where p(1), p(2), etc. are the discrete approximations of the peak ink deposition levels of each nozzle as a function of digital count (DC). Since each nozzle is unique due to variations in drop sizes each estimate is also expected to be unique. Furthermore, since halftoning produces local variations to ink deposition, analyzing marks created using multiple pels permits averaging which, reduces the local variations.

To achieve calibration at halftone calibration module 216, the total ink deposition must equal the target ink deposition. This assumes ink deposition follows principles of superposition. A simplifying approximation for the purposes of illustration is that each ink distribution follows a Gaussian model, having different standard deviation values for each nozzle. Thus, ink deposition from all nozzles $\{1, \ldots, n\}$ are summed for a set of grid points $\{x_1, \ldots, x_m\}$, where nozzle spatial locations of the n nozzles are defined by their position set $\{x_1, \ldots, x_n\}$ with a respective set of standard deviations for each nozzle from the set $\{a_1, \ldots, a_n\}$.

Figure 11A:
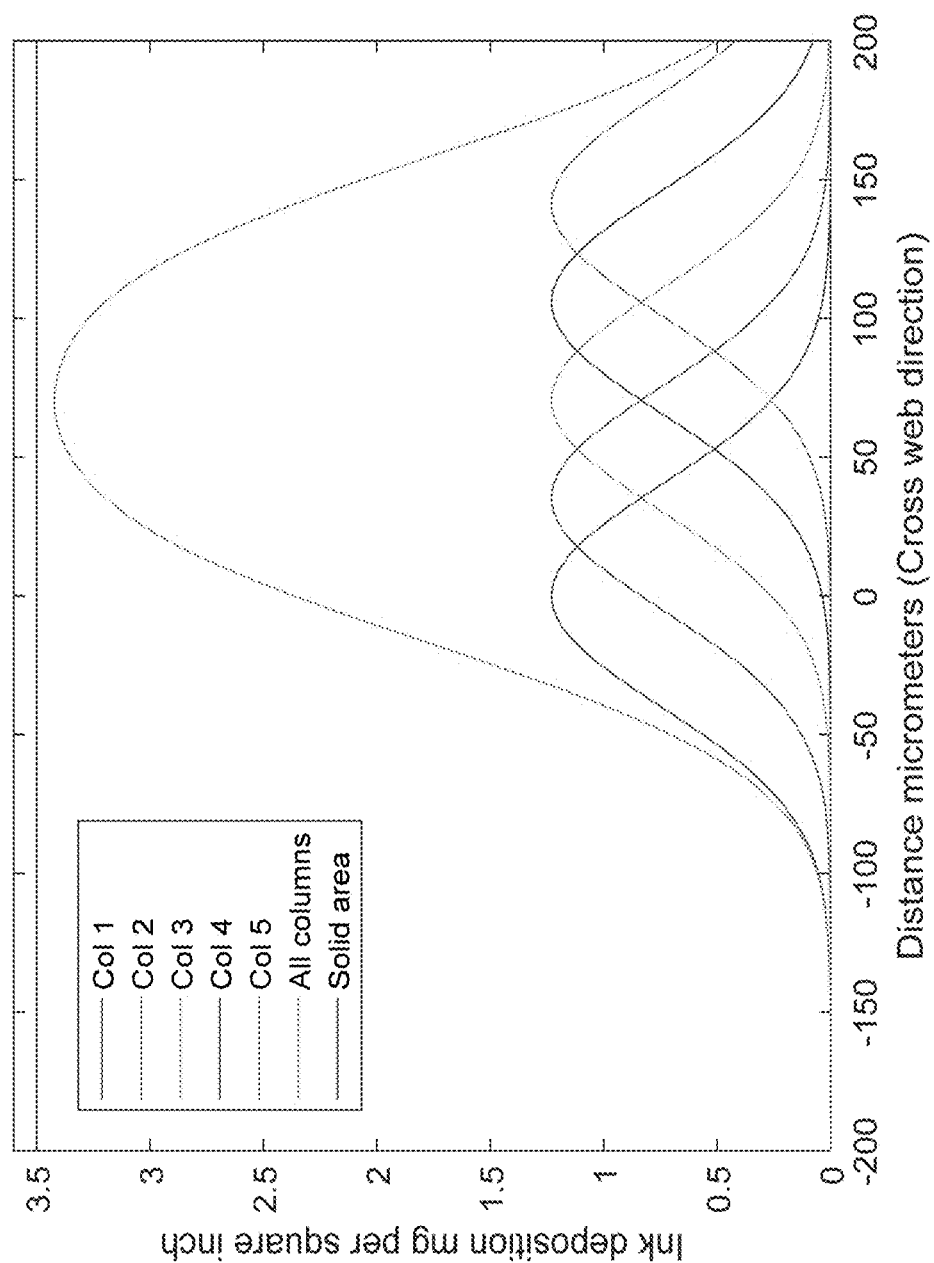
FIG. 11A illustrates one graph of ink deposition vs. a cross-web direction.

FIG. 11A illustrates one graph of ink deposition vs. a cross-web direction showing a contribution of nozzles (e.g., cols 1-5). As shown in FIG. 11A, the total ink deposition at any given point of the web has contributions from adjacent nozzles/drops. FIG. 11B illustrates one embodiment of nozzle contributions to the total ink deposition.

Typically, the set of grid points where the deposition is determined is finer than the grid of the nozzles to obtain inter-nozzle levels occurring between each nozzle and not just at the nozzle locations. The largest levels of ink deposition occur at the exact locations of the nozzles, due to the Gaussian distribution. Therefore, ink deposition between the nozzles should be determined to estimate the reduced depositions occurring at these points, which are associated with reduced OD levels. At these points white streaks can occur as opposed to points of high OD where dark bands will be produced. The nozzle locations are not assumed to be located on the uniform printer grid as defined by the printer dot per inch (DPI), at 1/DPI intervals. This facilitates accurately handling the case of nozzles printing with misdirected jets. Papers having different levels of ink spread can also be handled by such an approach, where the set of standard deviation values provide a measure of the magnitude of ink spread.

According to one embodiment, halftone calibration module 216 includes an uncalibrated deposition distribution module 217 that determines the set of uncalibrated deposition distributions px(DC) for the pel forming elements 165. In such an embodiment, the nozzles across the print medium web ($\{1, \ldots n\}$) are described by a set of respective uncalibrated average peak ink deposition functions ($\{p1(DC), \ldots, pn(DC)\}$), the nozzle locations ($\{x1, \ldots, xn\}$) and the standard deviations ($\{a_1, \ldots, a_n\}$).

Additionally, UncalTA represents an uncalibrated threshold array for the entire print medium 180 (e.g., web) width, having columns of threshold data corresponding to nozzles 1-n; and T(DC) represents a constant ink deposition target function, where Digital Count (DC) is the gray level value. Halftone calibration module 216 receives target response 224. Target response 224 may be retrieved stored data, data selected by print controller 140 and/or data selected by an operator through a user interface.

Target response 224 may be data that represents the desired OD of printed print medium 180 at different gray levels (e.g., digital count) values for a specific configuration of printer 160. As will be seen below, generating calibrated halftones 220 may be based on the target response 224. Selecting one of a plurality of target responses produces changes in the print quality (e.g., OD) of printed print media 180 as desired. Halftone calibration module 216 also includes a calibrated deposition distribution module 219 to determine a calibrated deposition to achieve a target response for the pel forming elements 165. In one embodiment, calibrated deposition distribution module 219 determines the set of calibrated average peak deposition functions that deliver the required or optimum target ink depositions response within a statistical (e.g., average, maximum, standard deviation) error amount.

Figure 4:
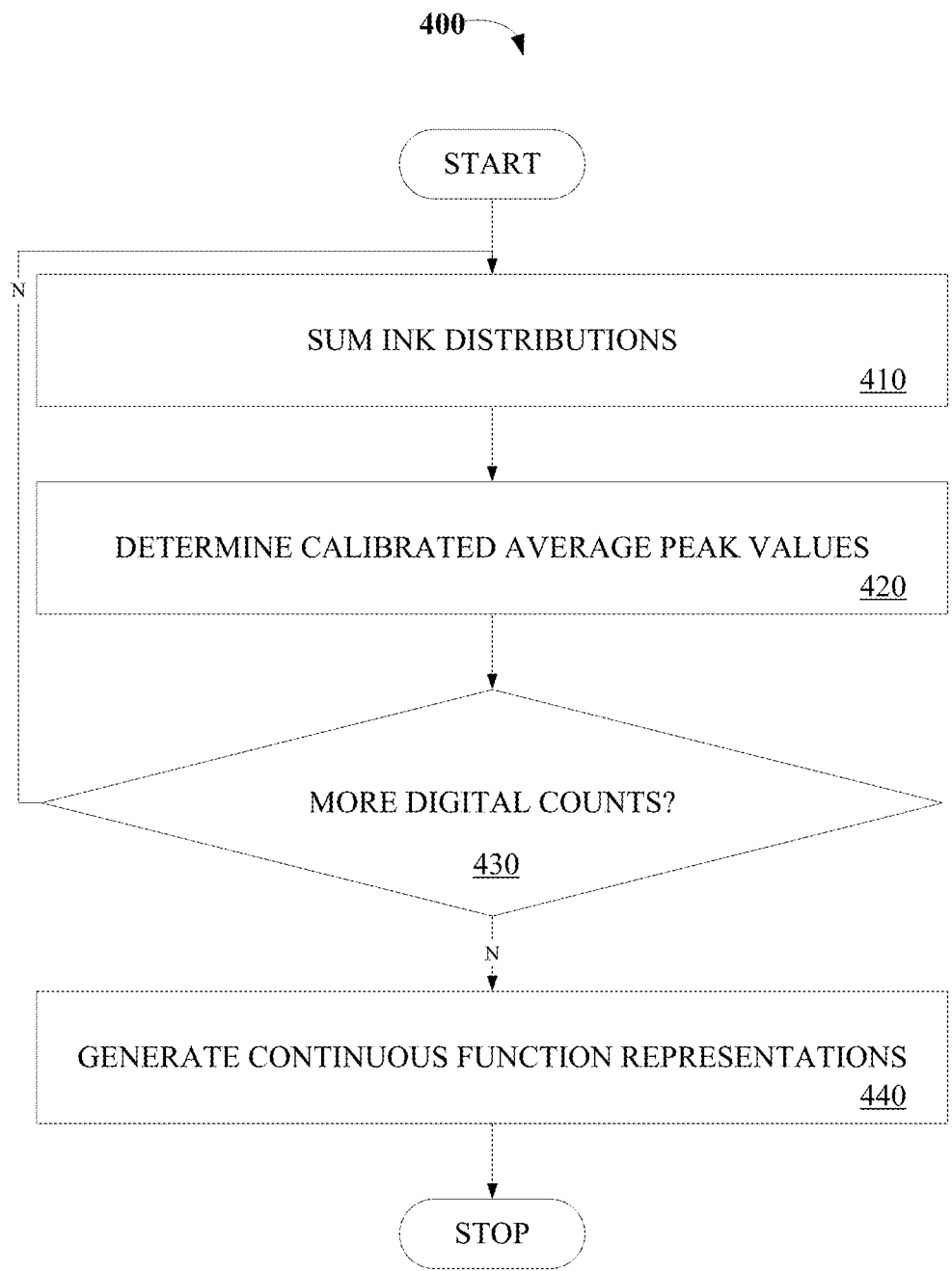
FIG. 4 is a flow diagram illustrating one embodiment of a process for determining a calibrated deposition for pel forming elements.

FIG. 4 is a flow diagram illustrating one embodiment of a process 400 for determining a calibrated deposition distribution for pel forming elements 165. Process 400 may be performed by processing logic that may include hardware (e.g., circuitry, dedicated logic, programmable logic, microcode, etc.), software such as instructions run on a processing device, or a combination thereof. In one embodiment, process 400 is performed by calibrated deposition distribution module 219.

At processing block 410, a sum of the ink contributions from all of the nozzles b, c, d, e, f, . . . n (e.g., adjacent nozzles) is performed to generate a total ink deposition at the set of grid points $\{x_1, \ldots, x_m\}$ (e.g., uncalibrated deposition distribution). At processing block 420, calibrated average peak values for each nozzle to achieve a target ink response at a gray level are determined for a specific digital count level (e.g., considering all ink contributors). The overall objective is to find an optimal Threshold Array which provides a set of calibrated average peak ink deposition functions $\{f1(DC), \ldots, fn(DC)\}$ to achieve the optimal match (e.g., within a statistical error value) of combined ink deposition to T(DC) for the set of m grid points $\{1, \ldots, m\}$ for all digital count values.

According to one embodiment, this can be expressed as a set of simultaneous linear equations, where the output is the target ink deposition for the digital count being evaluated and each linear term including the unknown value for the calibrated peak average vector times the contribution factor (e.g., known by substituting estimated or known values into the Gaussian equations). Alternately a constrained optimization approach may be used to bound the solution to specific desired limits. By having ink deposition levels output using the uncalibrated halftone be above the target response levels, the optimized calibrated average peak values may be determined.

At decision block 430, a determination is made as to whether there are additional digital counts for which the process is to be performed. If so, control is returned to processing blocks 410 and 420, where ink distributions are summed and calibrated average peak values are determined for the next digital count.

According to one embodiment, the process is repeated for each digital count $\{0, \ldots, 2^{bitdepth}-1\}$ level (e.g., a representative set) to form a vector calibrated average peak ink values for each nozzle. If at decision block 430 a determination is made that there are no additional digital counts, continuous function representations are generated for the functions by smoothing, processing block 440.

Referring to FIG. 2, halftone calibration module 216 determines calibration values for the pel forming elements 165 once the ink deposition functions have been generated. According to one embodiment, the calibrated values are included in the design of the calibrated halftones 220, which is described by a calibrated threshold array. In a further embodiment, the calibrated threshold array is generated based on an uncalibrated threshold array.

In yet a further embodiment, a calibrated threshold array is determined based on inverse transfer functions (ITFs) generated from the uncalibrated ink deposition functions, the calibrated ink deposition functions for each pel forming element 165. Accordingly, an ITF is determined for each nozzle x, and the uncalibrated ink deposition vector px(DC) for the measured OD data and the smoothed continuous function estimate for the calibrated ink deposition function (hx) of the target response data are used to determine the calibrated threshold array, such that:

$$g\_input = hx^{-1}(px(g\_output)) = ITF_x(g\_output)$$

In one embodiment, each column of the threshold array is transformed using the respective ITF for each nozzle x to determine the calibrated halftone threshold array required to achieve the desired ink deposition. In this ITF transformation, the uncalibrated thresholds for each column of the array are used as the g_output values in the equation for each respective nozzle x. The resulting g_input values from the ITF for column x ($ITF_x$) are used to form the column x threshold elements of the calibrated halftone.

Since ITF can only provide a single transformed value at a time, each element of the threshold array is transformed. Since a column of thresholds form a vector, the ITF transformation operates element by element on the vector to generate the respective elements of the vector forming the column for the calibrated halftone. There is a one to one correspondence between the nozzles and the columns in the threshold array. The result is a calibrated halftone which implements the disclosed algorithm when printing to achieve constant ink deposition from the adjacent nozzles which includes compensating for printing variations from the individual nozzles.

Figure 5:
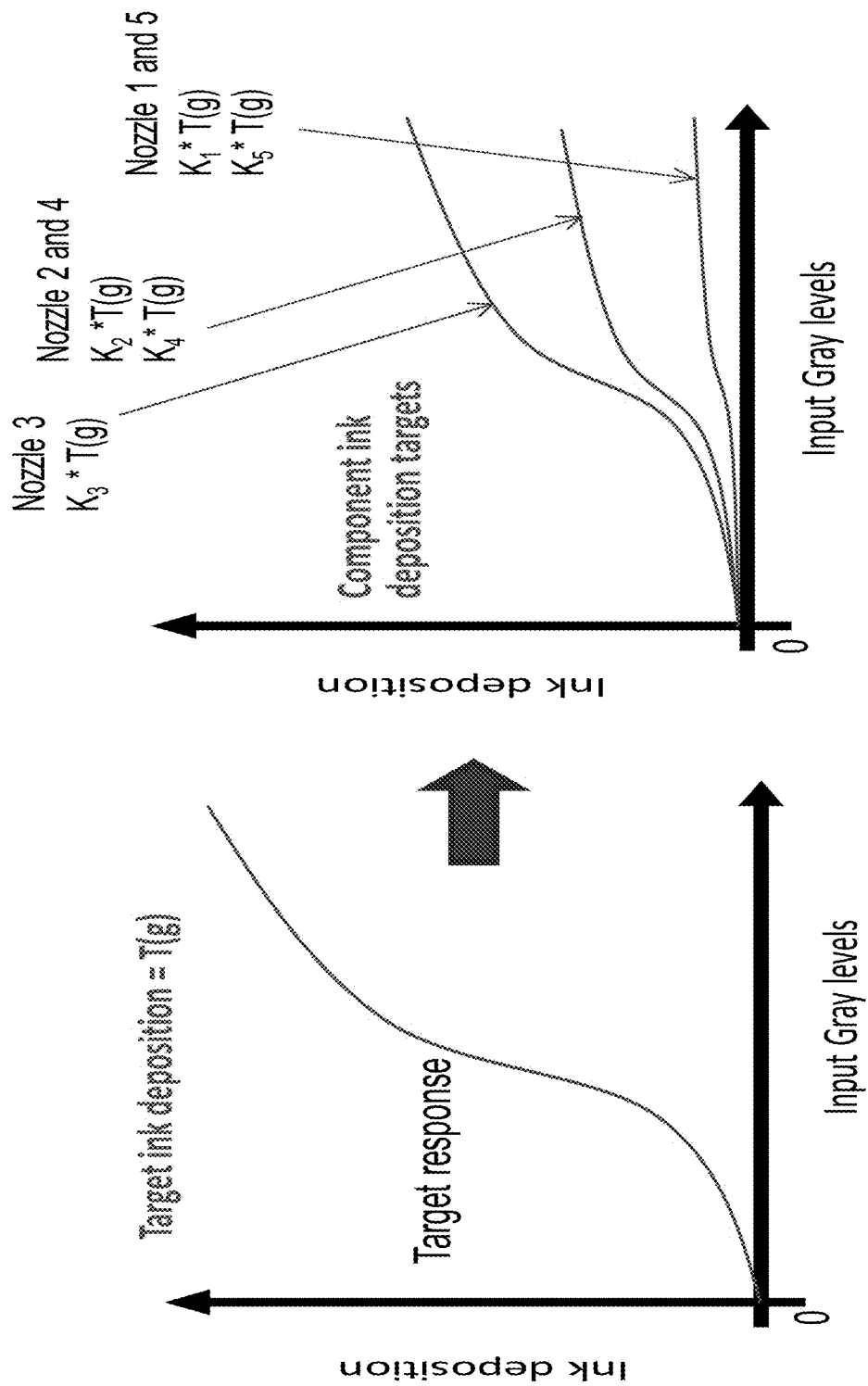
FIG. 5 illustrates one embodiment of a calibration halftone generation process using an inverse transform function.

FIG. 5 illustrates one embodiment of a calibration halftone generation process using an ITF. Target T(g) represents an ideal ink deposition response required for all points across a web for all gray level g to achieve OD target response. Target T(g) may be derived based on target response 224 by transforming (e.g., using Weibull ink density transform or other suitable methods) target response 224 data (e.g., OD of at different gray levels) to OD versus ink deposition values.

As shown in FIG. 5, the target is broken into separate components to be used as target for each nozzle calibration. For instance, the targets are at one point $x_1$, where $x_1$ is centered on nozzle 3. In this case the contribution from nozzle 3 and hence the $K_3$ contribution curve is largest. The contributions from five different nozzles are considered as the contributors to the ink deposition at $x_1$. Contributions from significant nozzles sum to the target response T(g), such that:

$$T(g)=(K_1+K_2+K_3+K_4+K_5)*T(g);$$

$$1=(K_1+K_2+K_3+K_4+K_5)$$

In one embodiment, K values are all within range 0-1, with no negative ink contributors. The set of calibrated average peak ink deposition functions {f1(DC), ..., fn(DC)} for each nozzle has been derived as described previously. This addresses the crosstalk between nozzles as related to their ink deposition. A further objective is to define the fx set of functions over the tone range. This allows us to define a final calibrated system which produces a desired calibrated tonal response such as linear OD and at the same time produce uniform cross web density. In this embodiment, a target ink deposition vs DC function T(g) is defined. Weibull can be used in this case to determine the ink deposition which provides the desired OD target vs digital count.

In one embodiment, the T(g) function is evaluated at each gray level g and the resulting total deposition used as the target total deposition for that gray level as previously described to achieve uniformity. This provides a way to derive the set of fx function to achieve a tonal objective as well as a cross web uniformity objective. This set of fx function is then used with their corresponding ink deposition set of curves using the ITF to compute the calibrated TA columns for all nozzles, which provides a precise solution for each set of nozzles for all points across the web. The final result is a means to generate a single calibrated web wide TA optimized to obtain an optimum uniform ink deposition for all nozzles and meet the desired tonal response.

Figure 6:
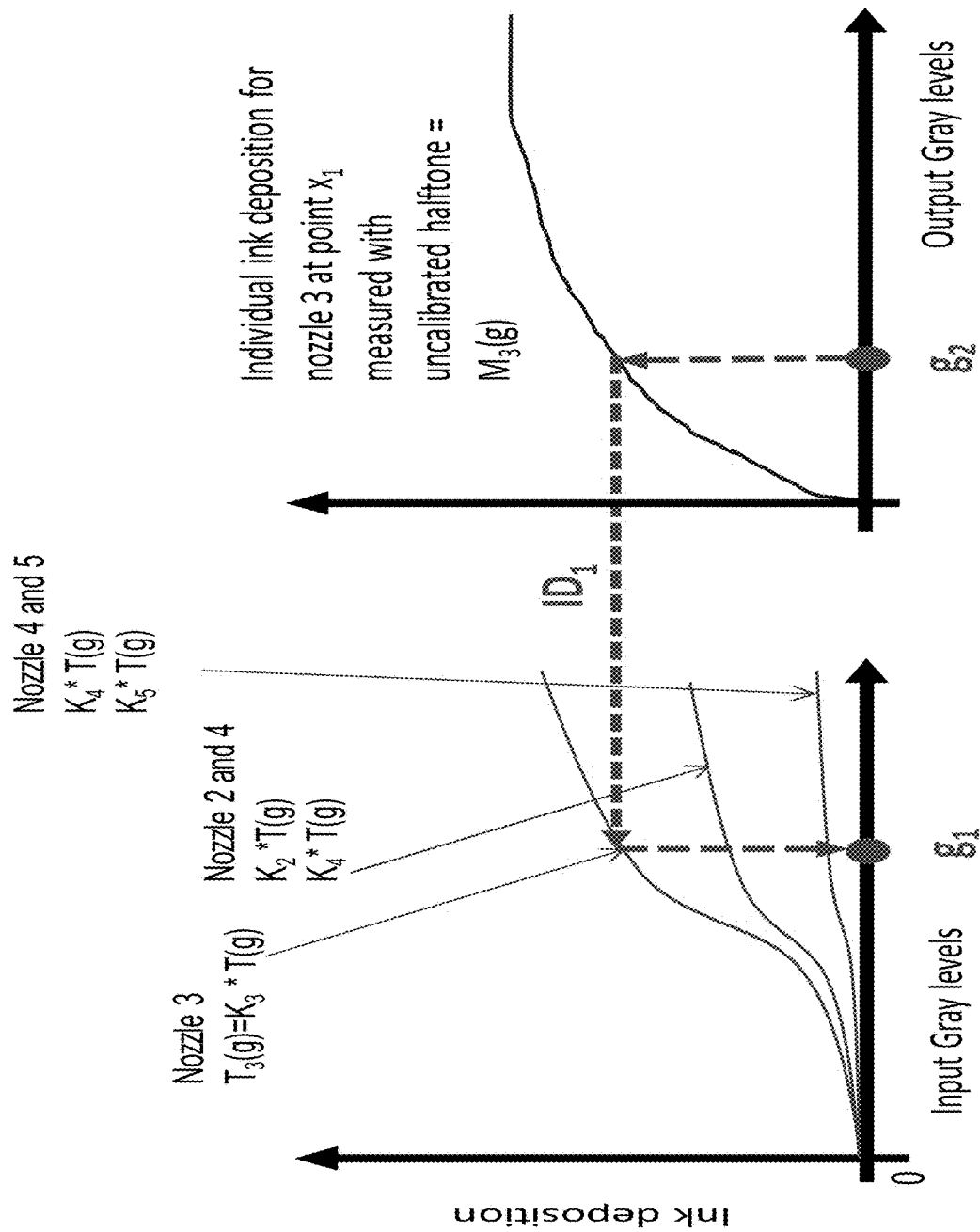
FIG. 6 illustrates one embodiment of a calibrated halftone for a pel forming element generated using an inverse transform function.

FIG. 6 illustrates one embodiment of a calibrated halftone for a pel forming element 165 (e.g., nozzle 3) generated using the ITF for a set of nozzles, such that:

$$g\_input = fx^{-1}$$

$$(M_x(g\_output))=ITF_x(g\_output)$$

Figure 7:
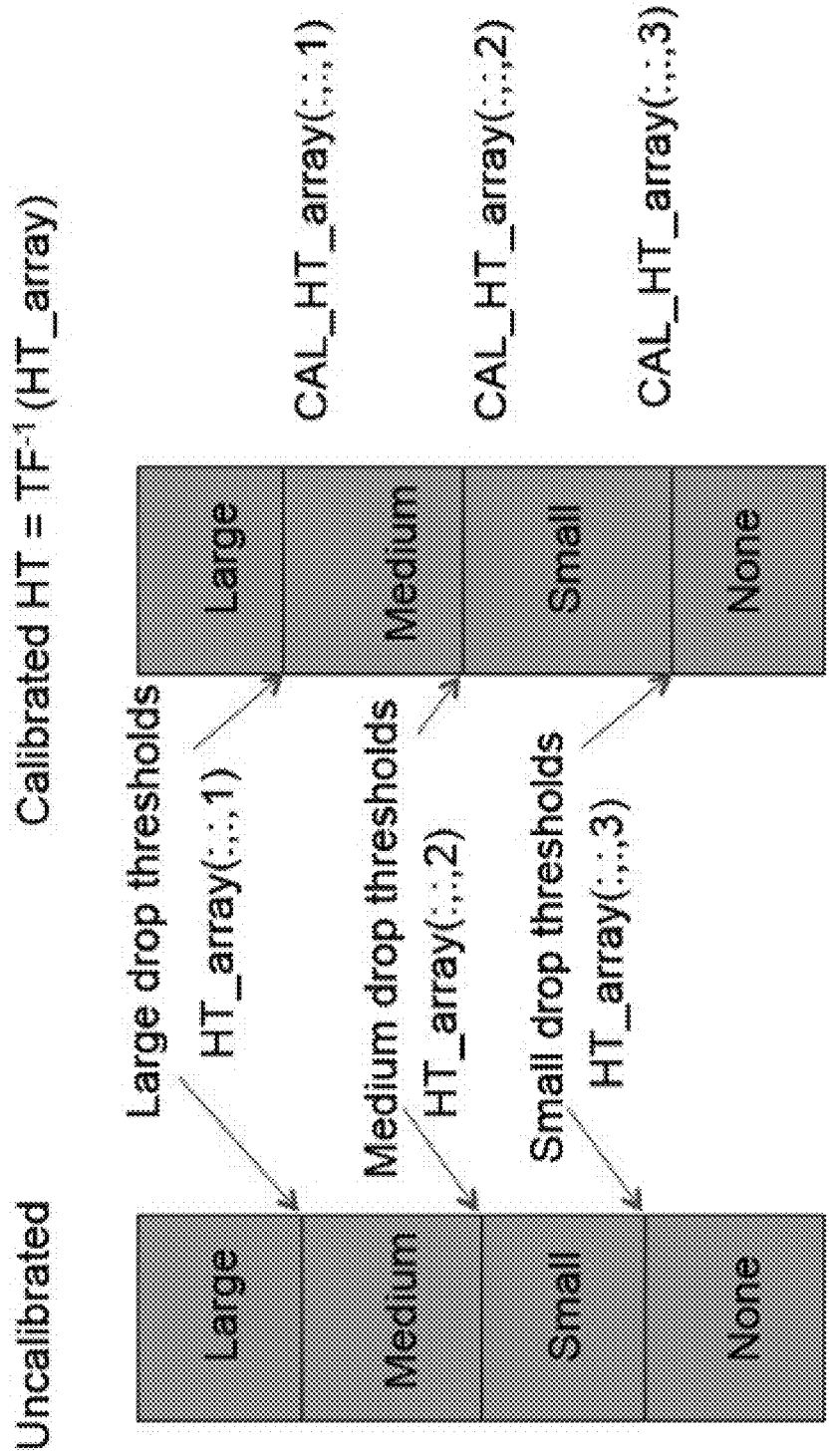
FIG. 7 illustrates one embodiment of a mapping between calibrated and un-calibrated multi-bit halftone output levels using an inverse transfer function.

FIG. 7 illustrates one embodiment of a mapping between calibrated and un-calibrated multi-bit halftone output levels using the inverse transfer function. In this illustration and the equations which follow, ITF is equal to $TF^{-1}$. This is illustrated for a single pel of the threshold array data in FIG. 7. Each pel has its own unique set of thresholds which is defined by the ITF for that column of pels in the array.

In one embodiment, the calculations result in the final set of Calibrated MTA threshold values: CAL_MTA_array(:,:,1)=$TF^{-1}$(MTA_array(:,:,1)); CAL_MTA_array(:,:,2)=$TF^{-1}$(MTA_array(:,:,2)); and CAL_MTA_array(:,:,3)=$TF^{-1}$(MTA_array(:,:,3)). Therefore, generalizing for any set of threshold data having any number of drop sizes or planes results in CAL_MTA_array=$TF^{-1}$(MTA_array).

In one embodiment, for a Large drop, I>$TF^{-1}$(MTA_array(:,:,1)). Similarly, for Medium, Small and None thresholds I>$TF^{-1}$(MTA_array(:,:,2)) & I<=$TF^{-1}$(MTA_array(:,:,1)); I>$TF^{-1}$(MTA_array(:,:,3)) & I<=$TF^{-1}$(MTA_array(:,:,2)); and None: I<=$TF^{-1}$(MTA_array(:,:,3)), respectively.

Figure 8:
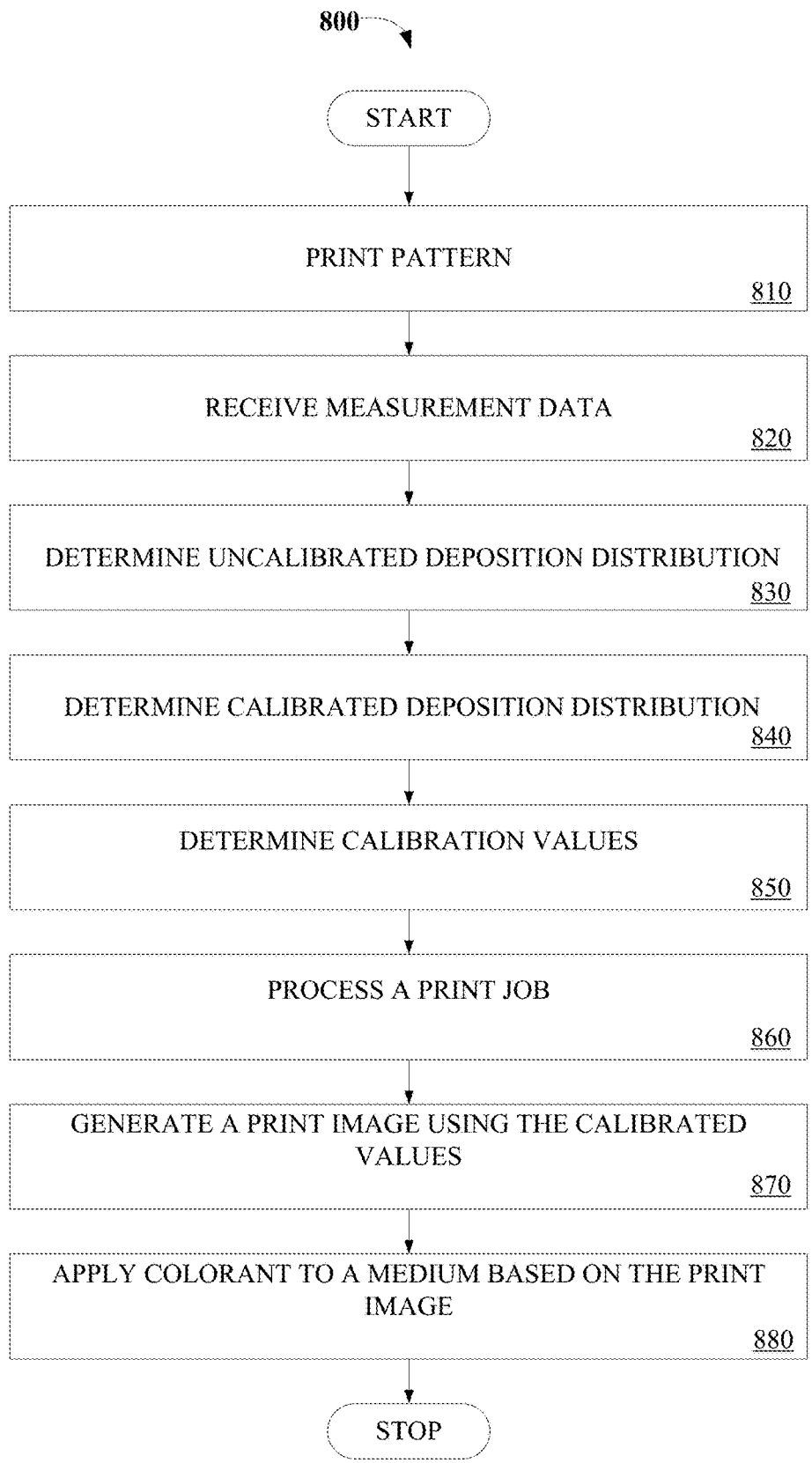
FIG. 8 is a flow diagram illustrating one embodiment of a process performed by a printing system.

FIG. 8 is a flow diagram illustrating one embodiment of a process 800 performed by a printing system. Process 800 may be performed by processing logic that may include hardware (e.g., circuitry, dedicated logic, programmable logic, microcode, etc.), software such as instructions run on a processing device, or a combination thereof.

Process 800 may begin at processing block 810, where a pattern is printed. At processing block 820, measured data for the pel forming elements 165 is received (e.g., measurement data 222). At processing block 830, the uncalibrated deposition distribution is determined for the pel forming elements 165 based on measurement data 222. At processing block 840, the calibrated deposition distribution to achieve the target response (e.g., based on the target response 224) is determined for the pel forming elements 165.

At processing block 850, the the calibration values are determined for each of the pel forming elements 165. In one embodiment, the calibrated values (e.g., calibrated halftones) are transmitted. At processing block 860, a print job is processed to generate print image data (e.g., halftoned bitmap data) using the calibration values. At processing block 870, a print image is generated using the calibrated values. At processing block 880, colorant is applied to a medium based on the print image.

Although shown as a component of print controller 140, other embodiments may feature halftone calibration module 216 included within an independent device, or combination of devices, communicably coupled to print controller 140. For instance, FIG. 9 illustrates one embodiment of a halftone calibration module 216 implemented in a network 900.

Figure 9:
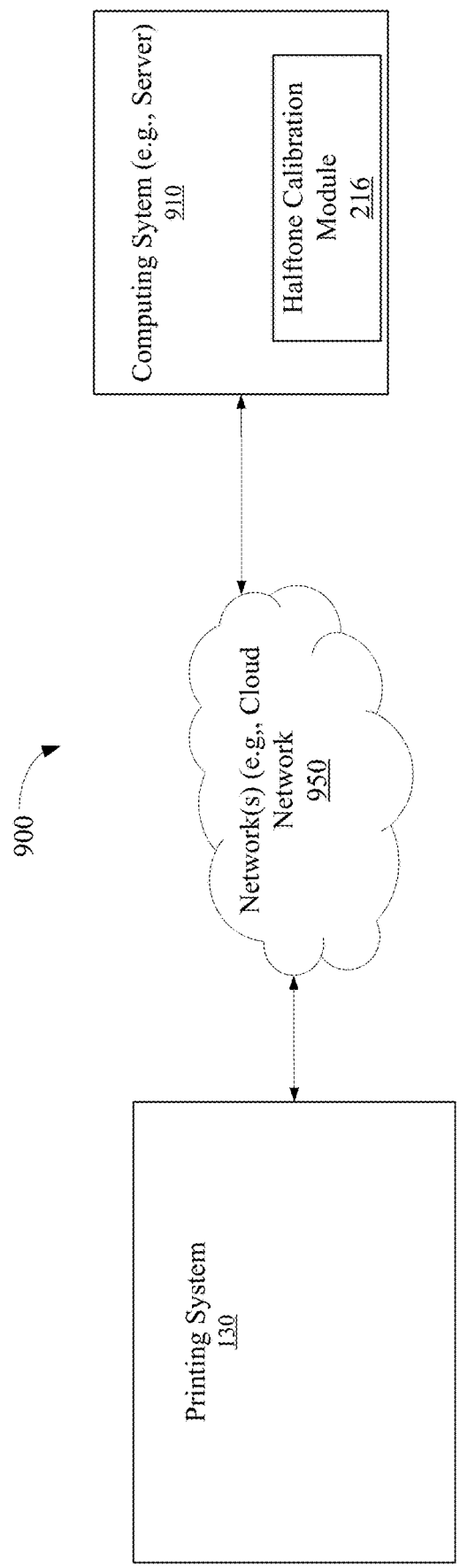
FIG. 9 illustrates one embodiment of a halftone calibration module implemented in a network.

As shown in FIG. 9, halftone calibration module 216 is included within a computing device 910 and transmits calibrated halftones 220 to printing system 130 via a cloud network 950. Printing system 130 receives calibrated halftones 220. In this embodiment, processing blocks 830-870 may be performed at computing system 910, while processing block 880 is performed at printing system 130. In another embodiment, processing block 870 may also be performed at printing system 130.

Figure 10:
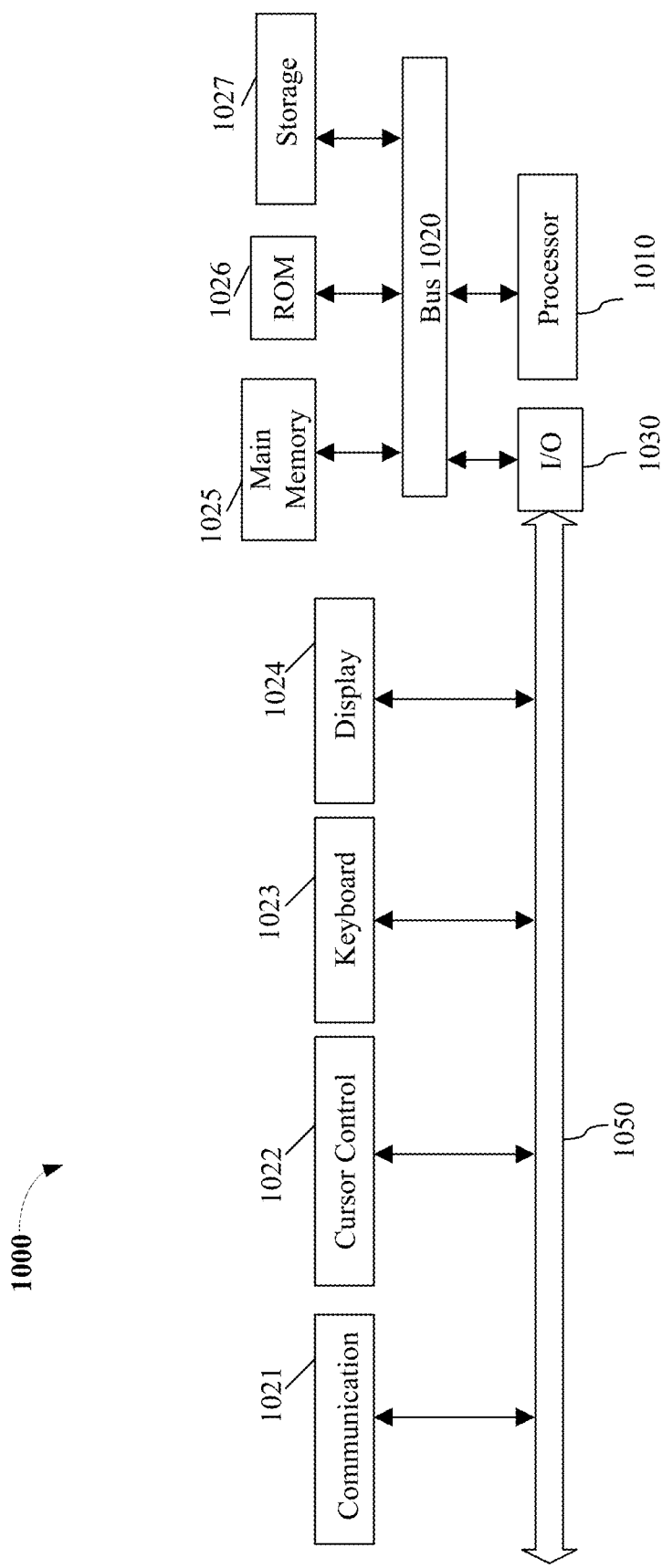
FIG. 10 illustrates one embodiment of a computer system.

FIG. 10 illustrates a computer system 1000 on which printing system 130 and/or halftone calibration module 216 may be implemented. Computer system 1000 includes a system bus 1020 for communicating information, and a processor 1010 coupled to bus 1020 for processing information.

Computer system 1000 further comprises a random access memory (RAM) or other dynamic storage device 1025 (referred to herein as main memory), coupled to bus 1020 for storing information and instructions to be executed by processor 1010. Main memory 1025 also may be used for storing temporary variables or other intermediate information during execution of instructions by processor 1010. Computer system 1000 also may include a read only memory (ROM) and or other static storage device 1026 coupled to bus 1020 for storing static information and instructions used by processor 1010.

A data storage device 1025 such as a magnetic disk or optical disc and its corresponding drive may also be coupled to computer system 1000 for storing information and instructions. Computer system 1000 can also be coupled to a second I/O bus 1050 via an I/O interface 1030. A plurality of I/O devices may be coupled to I/O bus 1050, including a display device 1024, an input device (e.g., an alphanumeric input device 1023 and or a cursor control device 1022). The communication device 1021 is for accessing other computers (servers or clients). The communication device 1021 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A system comprising:
   at least one physical memory device to store halftone calibration logic; and
   one or more processors coupled with the at least one physical memory device to execute the halftone calibration logic to determine an uncalibrated ink deposition distribution for each of a plurality of pel forming elements based on measured data, determine a calibrated ink deposition distribution for each of the plurality of pel forming elements based on a target response including generating a total ink deposition based on an ink sum contributed by each of the plurality of pel forming elements and determining calibrated average peak values for each of the plurality of pel forming elements to achieve the target ink deposition, and determine calibration values for each of the plurality of pel forming elements, wherein the target response comprises a target ink deposition.

2. The system of claim 1, wherein the calibration values for each of the plurality of pel forming elements are included in a calibrated halftone design.

3. The system of claim 2, wherein the calibrated halftone design comprises a calibrated threshold array.

4. The system of claim 3, wherein the calibrated threshold array is generated from an uncalibrated threshold array and an inverse transform function associated with each of the plurality of pel forming elements.

5. The system of claim 4, wherein the inverse transform functions are generated using the uncalibrated ink deposition distribution for each of a plurality of pel forming elements and the calibrated ink_deposition distribution for each of the plurality of pel forming elements.

6. The system of claim 1, wherein the at least one physical memory device to further store interpreter logic, wherein the processor executes the interpreter logic to process print job data and determine print image data using the calibration values for the pel forming elements.

7. The system of claim 6, wherein the at least one physical memory device to store halftone calibration logic, wherein the processor executes the halftoning logic to generate a print image using the calibration values for the pel forming elements.

8. The system of claim 7, further comprising a printer to apply colorant to a medium via the pel forming elements based on the print image.

9. A non-transitory computer-readable medium having stored thereon instructions that, when executed by one or more processors, cause the one or more processors to:
   determine an uncalibrated ink deposition distribution for each of a plurality of pel forming elements based on measured data;
   determine a calibrated ink deposition distribution for each of the plurality of pel forming elements based on a target response, including:
      generating a total ink deposition based on an ink sum contributed by each of the plurality of pel forming elements; and
      determining calibrated average peak values for each of the plurality of pel forming elements to achieve the target ink response, wherein the target response comprises a target ink deposition; and
   determine calibration values for each of the plurality of pel forming elements.

10. The machine-readable medium of claim 9, wherein the calibration values for each of the plurality of pel forming elements are included in a calibrated halftone design.

11. The machine-readable medium of claim 10, wherein the calibrated halftone design comprises a calibrated threshold array.

12. The machine-readable medium of claim 11, wherein the calibrated threshold array is generated from an uncalibrated threshold array and an inverse transform function associated with each of the plurality of pel forming elements.

13. The machine-readable medium of claim 12, wherein the inverse transform functions are generated using the uncalibrated ink deposition distribution for each of a plurality of pel forming elements and the calibrated ink_deposition distribution for each of the plurality of pel forming elements.

14. The machine-readable medium of claim 9, comprising a machine-readable medium including data that, when accessed by a machine, further cause the machine to:
   process print job data; and
   determine print image data using the calibration values for the pel forming elements; and
   generate a print image using the calibration values for the pel forming elements.

15. A method comprising:
  determining an uncalibrated ink deposition distribution for each of a plurality of pel forming elements based on measured data;
  determining a calibrated ink deposition distribution for each of the plurality of pel forming elements based on a target response including:
    generating a total ink deposition based on an ink sum contributed by each of the plurality of pel forming elements; and
    determining calibrated average peak values for each of the plurality of pel forming elements to achieve a target ink deposition, wherein the target response comprises a target ink deposition; and
  determining calibration values for each of the plurality of pel forming elements.

16. The method of claim 15, wherein the calibration values for each of the plurality of pel forming elements are included in a calibrated halftone design.

17. The method of claim 16, wherein the calibrated halftone design comprises a calibrated threshold array.

18. The method of claim 17, wherein the calibrated threshold array is generated from an uncalibrated threshold array and an inverse transform function associated with each of the plurality of pel forming elements.

19. The method of claim 18, wherein the inverse transform functions are generated using the uncalibrated ink deposition distribution for each of a plurality of pel forming elements and the calibrated ink deposition distribution for each of the plurality of pel forming elements.

20. The method of claim 15, further comprising:
  processing print job data; and
  determining print image data using the calibration values for the pel forming elements; and
  generating a print image using the calibration values for the pel forming elements.

* * * * *